March 11, 1952     J. ZIELINSKI     2,589,183
HIGH-PRESSURE JET NOZZLE
Filed Nov. 12, 1948
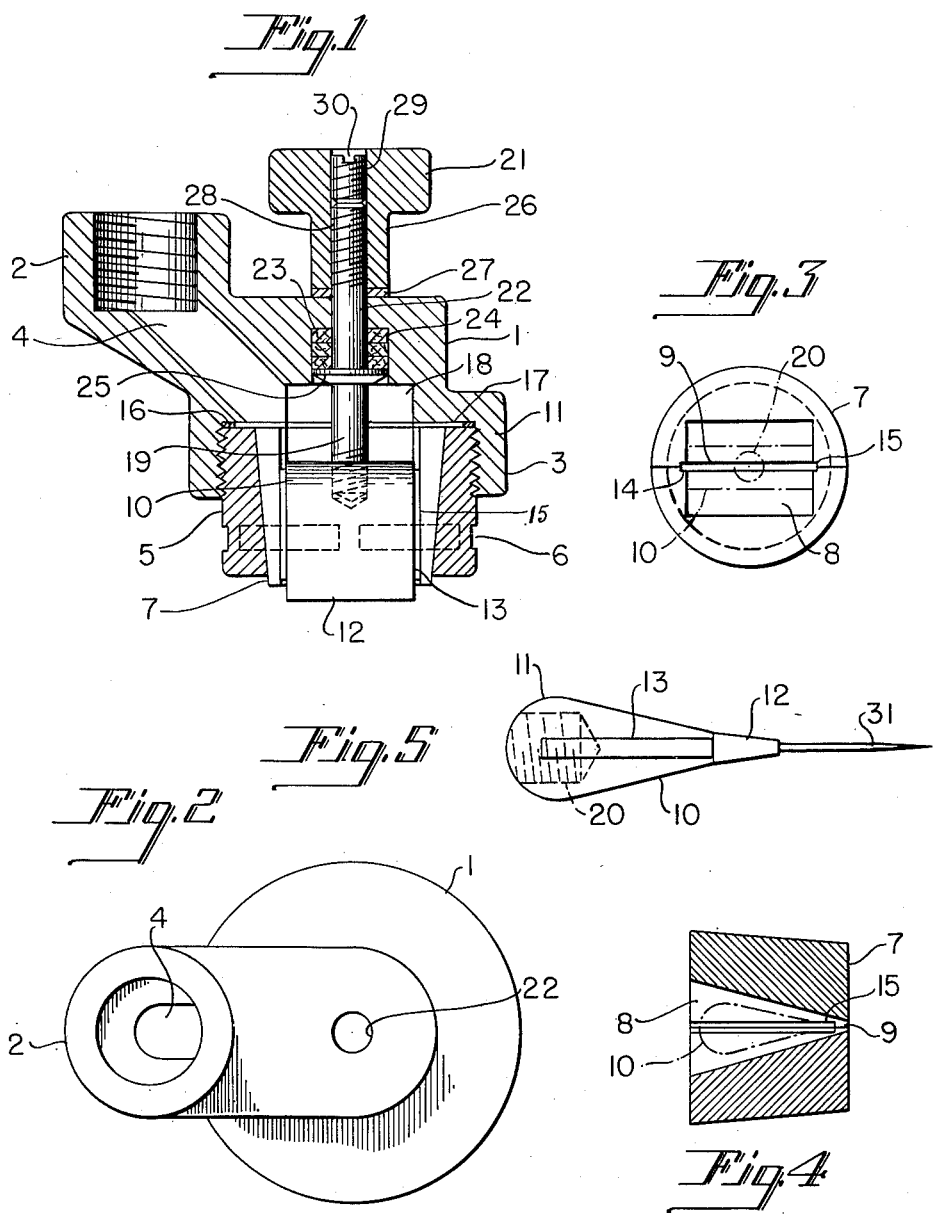
INVENTOR.
Joseph Zielinski
BY
William F. Nickel
ATTORNEY Patented Mar. 11, 1952

2,589,183

UNITED STATES PATENT OFFICE 2,589,183

HIGH-PRESSURE JET NOZZLE

Joseph Zielinski, Brooklyn, N. Y.

Application November 12, 1948, Serial No. 59,709

4 Claims. (Cl. 299—150)

My invention is an improvement in nozzles and casings therefor, particularly nozzles for discharging a fluid medium therefrom in the form of a relatively thin flat jet having a predetermined width.

An important object of this invention is to provide a device of the kind mentioned with a simple and durable casing, having all the necessary parts, designed to carry fluid at high pressure and to operate with great efficiency.

Another object is to provide a nozzle member which can be mounted in the outlet end of the casing and easily detached, and is adapted to receive a valve member that regulates the passage of the fluid and can easily be adjusted from the exterior of the casing.

Other objects and advantages are fully described hereinafter and the novel features are pointed out in the claims. The drawings illustrate a preferred embodiment of the invention, but various changes in structural details can be made without departing from the general plan by which the invention is distinguished.

On the drawings:

Figure 1 is a longitudinal section of the nozzle of this invention and its enclosing casing; taken in the plane of the centers of the inlet and discharge ends of the casing.

Figure 2 is an elevation thereof, seen from the inlet side or end of the casing.

Figure 3 is a view of the inner end of the nozzle member;

Figure 4 is a longitudinal section thereof; and

Figure 5 is a side view of the controlling valve, on an enlarged scale.

The casing 1 is of stainless steel and has an internally threaded boss 2 at one end for connection with a supply pipe, and at the opposite or outlet end is a larger boss 3. The interior spaces of the bosses 2 and 3 are connected by a duct 4. The boss 3 is also internally threaded, and the hollow nut 5 having flat external faces 6 is screwed into the open outer end of the boss 3, to retain the nozzle member 7, which has a central bore 8 opening through both ends thereof. The nozzle 7 is of brass and consists of two semicircular matching halves with complementary recesses to make the bore 8. It is flat at both ends, but the outside lateral surface is conical, making the nozzle taper from its inner or inlet end to the outer end or discharge thereof. The bore 8 is rectangular in cross section, relatively large at the inner end of the member, the bore having two opposite flat parallel faces, the other two converging; so that the bore 8 contracts to a wide but thin aperture or slit 9 in the smaller outlet end of the nozzle 7.

In the nozzle 7 is a valve head 10, square or rectangular in plan, with opposite flat parallel faces presented to the parallel faces of the bore 8. It has a comparatively thick and rounded rear or inner end 11, from which the other two faces converge towards the opposite end 12. When seen from one side it has the shape indicated in Figure 4. Thus it virtually conforms to the tapering bore 8, and the flow of fluid through the bore can be regulated by adjusting this valve. On both flat sides of this valve are longitudinal guide projections or ribs 13, and the two parts of the nozzle 7 are rabbeted or have shoulders 14 in their engaging faces along their inner edges at the flat sides of the bore 8; these edges constitute channels 15 in which the ribs 13 fit when the member 7 is assembled, to permit sliding movement of the valve in the nozzle to adjusted position.

The bore of the nut 5 tapers from end to end to match the nozzle 7 and envelops it snugly, and the nut 5 is screwed in tightly against a gasket 16 on a shoulder 17 in the boss 3. Beyond the shoulder 16 the interior of the boss is extended to give a space or chamber 18 behind the valve and nozzle to receive fluid from the duct 4.

The valve is actuated by a stem 19 which is joined to it by screwing the stem into an opening 20 at the inner rounded end 11 of the valve. As illustrated in Figures 1 and 2 the boss 2 is laterally offset, so that the stem 19 can be mounted in the casing 1 and project therefrom at one side of the boss 2. This stem bears at operating knob 21 on its outer end. The stem 19 projects through a bore 22 extending from the chamber 18 through the end of the casing having the boss 2, and having a shoulder 23 inside the casing to receive elastic packing glands 24; and the stem has a collar 25 to press against these perforated disks 24 and hold them in place. The knob 21 has a neck 26, and between the neck and the outside of the casing is an elastic washer 27. The neck has screw-threaded engagement with the outer end of the stem 19 and the knob has a threaded bore 28 receiving a small threaded stud 29 to be forced against the end of the stem to hold the knob fast thereon. The stud has a recess 30 for a screw driver or the like tool, to turn the stud.

The knob 21 is attached to the stem 19 by screwing the neck 26 on the outer end of the stem. It is made rigid therewith by tightening the stud 29 against the stem, so that rotation of the knob produces rotation of the stem also.

As the stem 19 has screw-threaded engagement with the opening 20 in the valve 10 the turning of the stem causes the valve to shift, and the thin end 12 approaches the delivery port 9 or recedes therefrom according to the direction of rotation. When the ribs abut the front ends of the channels 15, the effective area of the slit 9 is a minimum, or the opening 9 may then be closed entirely by the valve 7.

This valve, as indicated on Figure 5 is also adapted to carry a blade-like strip 31 with one edge embedded in the end 12 thereof and the remainder projecting and having an edge that is acute. The channels 15 terminate at the most advantageous points adjacent the delivery aperture 9, and the blade or plate 12 protrudes at this aperture. The jet is divided by the plate 31, but the two parts unite at the acute edge thereof.

The converging faces of the valve 10 are slightly concave; hence the spaces between the valve and the bore 8 are of such shape as to afford an approximately Venturi-tube effect and give a smooth flow of the fluid through them.

This sprayer nozzle is well calculated to discharge a continuous sheet of fluid of constant cross section and volume at all points along the length of the opening 9. The fluid may be gas or liquid, and the pressure of the fluid at the discharge opening may be varied over a wide range by adjusting the valve plate to be close to or relatively remote from the opening 9. The nozzle or sprayer can be employed operating a rotary engine for descaling, debarking and washing, and other operations; for cooling and for extinguishing fires, or to emit a thin sheet of liquid for dyeing. The plate 31 can of course be made as long or as short as necessary.

The structure of the casing, nozzle and valve head is such that the fluid entering the body is uniformly distributed inside the casing, and is forced to pass by over both converging faces of the valve 10. This valve prevents turbulence and gives the fluid a smooth flow up to the outlet 9. The valve has such shape in relation to the inside surfaces of the nozzle 7 as to give to all the fluid in contact with it, the same direction. The fluid thus is given a constant pressure and the outgoing jet has a substantially constant cross-sectional area along the full length of the plate.

The valve 10 having the cross section above stated, the spaces between the valve and the converging surfaces of the nozzle cause the fluid to have a very smooth and rapid flow past the valve head. The two currents converge and unite adjacent the end of the plate 31 in the opening 9. This distance is regulated by the concavity and slope of the valve 10, and the effect of a small vacuum created over and under the valve by the rapid passage of the fluid past the valve head 10. The slight difference in pressure flattens out the spray entirely as it leaves the casing; and affords the uniform continuous jet desired.

The blade 31 can be made in one piece with the valve 10 and it merges smoothly with the outer surfaces of the valve at the forward end 12. Also the casing 1 and member can obviously be made of other metals if desired.

Having described my invention, what I believe to be new is:

1. The combination of a casing having an outlet, a nozzle member in the casing at said outlet, a valve in said member and enveloped thereby, the casing also having an inlet offset from the outlet, and an adjusting stem connected to the valve and projecting to the outside of the casing adjacent said inlet for longitudinally adjusting the valve, the exterior of said nozzle tapering towards the discharge end thereof, and a hollow nut enveloping the nozzle and screw-threaded into the casing at said outlet.

2. The combination of a casing having an outlet, a nozzle member and means for securing said member to casing at said outlet, a valve in said member, the casing also having an inlet offset from the outlet, and an adjusting stem connected to the valve and projecting to the outside of the casing adjacent said inlet for adjusting the valve, said member comprising two halves with complementary recesses forming a bore through said member, said halves having matching engaging faces with shouldered edges at the sides of said recesses to form guide channels, and ribs at the sides of the valve received in said channels.

3. The combination of a casing, a nozzle therein, the outside of said nozzle tapering towards its delivery end, and having a bore shaped to contract towards said end and terminate in a wide, narrow aperture thereat, a hollow nut engaging the casing, said nut having a bore expanding inward of the casing and enveloping said nozzle, a valve in the nozzle to control said aperture, and means for adjusting said valve, said nozzle consisting of two halves with engaging faces and complementary recesses to form the bore, said faces having matching shouldered edges at the sides of said recesses forming channels extending towards said aperture, said valve having ribs at the sides received in said channels.

4. The combination of a casing having a nozzle therein, said nozzle tapering towards its delivery end, said nozzle also having a bore therethrough, the bore being rectangular in cross-section, contracting towards said end and terminating in a narrow aperture thereat, the nozzle consisting of two halves with engaging faces and complementary recesses to form said bore, said faces having matching shouldered edges at the sides of said recesses to form channels extending towards said aperture, a valve in said bore having ribs at the sides in said channels, said bore terminating in a wide thin aperture, said valve having opposite faces converging to a thin end of the valve adjacent said aperture, and means for adjusting said valve, the casing also bearing a nut having a tapering bore enveloping said nozzle member and mounting it in the casing.

JOSEPH ZIELINSKI.

REFERENCES CITED

The following references are of record in the file of this patent:

UNITED STATES PATENTS

| Number | Name | Date |
|---|---|---|
| 384,524 | Heberer | June 12, 1888 |
| 422,782 | Hills et al. | Mar. 4, 1890 |
| 695,967 | Thurman | Mar. 25, 1902 |
| 807,025 | Henry, Jr. | Dec. 12, 1905 |
| 933,464 | Kasjens | Sept. 7, 1909 |
| 1,076,963 | Doble | Oct. 28, 1913 |
| 1,094,124 | Coen | Apr. 21, 1914 |
| 1,133,711 | Cornelius | Mar. 30, 1915 |
| 1,184,355 | Kohler | May 23, 1916 |
| 1,298,543 | Mobley | Mar. 25, 1919 |
| 1,466,788 | Caracristi | Sept. 4, 1923 |
| 1,821,272 | Peterson | Sept. 1, 1931 |
| 2,130,629 | Clayton | Sept. 20, 1938 |
| 2,408,099 | Sherman | Sept. 24, 1946 |
| 2,442,991 | Allen | June 8, 1948 |
| 2,473,933 | Zielinski | June 21, 1949 |

FOREIGN PATENTS

| Number | Country | Date |
|---|---|---|
| 400,837 | Great Britain | Nov. 2, 1932 |
| 573,212 | Germany | Mar. 30, 1933 |